UNITED STATES PATENT OFFICE.

ABRAHAM E. HORN, OF NEW YORK, N. Y.

PROCESS OF TREATING LIME.

1,348,494. Specification of Letters Patent. Patented Aug. 3, 1920.

No Drawing. Application filed June 12, 1919, Serial No. 303,590. Renewed June 28, 1920. Serial No. 392,512.

*To all whom it may concern:*

Be it known that I, ABRAHAM E. HORN, a citizen of the United States, residing in New York, in the county of New York and State of New York, have invented certain new and useful Improvements in Processes of Treating Lime, of which the following is a specification.

This invention relates to a process of treating calcium oxid or quick lime to form a hydrated product containing water-proofing agents, specifically an insoluble soap of calcium and relates especially to a process of treating quick lime which comprises slaking lime and adding a fatty acid before slaking is completed, the proportion of water employed for slaking purposes being sufficient only to produce a dry powder or pulverulent material.

The slaking or hydration of the lime may be carried out either as a batch or intermittent method or as a continuous process. Pure calcium oxid calls for 18 parts by weight of water to 56 parts of the oxid for complete hydration or a ratio of water to calcium oxid of approximately 1:3. In commercial quick lime impurities modify this water requirement. The magnesium oxid in dolomitic lime also affects the amount of water. Roughly from 30 to 50% of water may be used to form a dry powder or one which contains only such an excess of water absorbed in the powdered mass as does not affect the pulverulent qualities of the latter. On the other hand incomplete hydration may be resorted to in some cases so that unchanged calcium oxid is present. In the present invention it is desirable to have the material in the form of a very fine powder in order that it may be mixed uniformly with other material such as Portland cement in order to produce a waterproofed mass.

While any form of quick lime may be used in carrying out the present invention I prefer what is known in the trade as a high calcium lime in preference to a dolomitic lime. A product containing not over 3 to 5% of magnesium oxid is preferred. For hydration purposes this is preferably crushed to produce a product of about the size of grains of wheat.

As stated the operation may be carried out intermittently but I preferably use a continuous method which forms the illustrative embodiment of the present invention. The following details are cited by the way of illustration only and are not to be regarded as expressing any limitation with respect to carrying out the process of the present invention in various ways or by divers modifications as will be apparent to those skilled in the art now that I have made the present disclosure.

The continuous process may be carried out simply by feeding the crushed lime into a trough having an agitator or conveyer which propels the lime gradually from one end to the other. Water is added at the point of entry, the amount of the latter being about 35% or more of the weight of the lime. The water is allowed to flow in at such a rate that it is proportioned to the lime in the ratio of between 2 and 3 parts of lime to 1 of water. A high-calcium or "hot" lime will begin to hydrate immediately and as soon as hydration has begun a quantity of fatty acid is added to the reaction mass. The time at which this fatty acid is added depends upon the rate with which the lime hydrates but for a high calcium lime containing not more than 2 or 3% of magnesium oxid the fatty acid may be added about one foot from the point at which the water comes in contact with the lime.

The fatty acid may be stearic acid in a powdered or molten state or other fatty acids such as oleic, palmitic, erucic, behenic, lauric, hydroxy, stearic, linoleic, linolenic acids and the like. Abietic acid or rosin and other resin acids may be used as an equivalent for the fatty acid although these resin acids are not as reliable for water-proofing purposes. Mixtures of these fatty acids with or without other water-proofing agents may be employed. The term fatty acid as used herein embraces those fatty acids which form water-insoluble soaps with lime, or in other words soap-forming fats, fatty acids or resin acids fall within the purview of this invention. Fats of a rancid nature may be used in some cases also petroleum or asphaltic oils in part at least. Mixtures of oleic acid with the fatty acids of a drying oil are desirable. For example a mixture of equal parts of oleic acid (red oil) and the fatty acids of linseed oil is a satisfactory fatty acid mixture which is preferred in the present invention although the latter is by no means limited to such specific fatty acid composition. This mixture of fatty acids is liquid and may be added either hot or cold to the calcareous material undergoing hydration. The fatty acid may be atomized or simply mixed in with the quick lime undergoing hydration. Generally speaking I prefer to use from 5 to 15% by weight of fatty acid to quick lime. Specifically I prefer to keep the amount of fatty acid between 10 and 12%. One part of quick lime combines with about 10 parts of oleic acid to produce calcium oleate. In using the proportions above indicated the conditions are reversed approximately 10 parts of quick lime being used to one part of oleic acid. This gives what is apparently a basic compound distributed throughout the hydrated lime as a carrier.

While it is not impossible to add the fatty acid to the quick lime before the water is introduced, preferably as stated, the fatty acid is added subsequent to the addition of water. It appears that while the quick lime is undergoing hydration and is developing great local heat with rapid increase in volume there is some condition of nascency which renders the calcium compound more reactive so that the basic compound with the fatty acid is formed in an advantageous and effective manner. By carrying out the reaction in this way the particles of hydrated lime are so intimately incorporated with the fatty acid compound that they have unusually effective waterproofing qualities. The product made in the preferred manner for example has desirable properties which may be ascertained by means of a very simple test. A small amount of the product is placed in a glass of water and floats on the surface. On sticking one's finger into the liquid the former does not become wet, due apparently to the increased surface tension brought about by the hydrated lime and calcium soap compound prepared in this manner. In waterproofing concrete no endeavor is made to fill the voids but rather to line or coat the capillaries so as to increase the frictional resistance to moisture. The present composition increases the coefficient of friction in a highly satisfactory manner. In addition the invention has the advantage that two reactions are performed in one operation. Heretofore lime has been hydrated at one point and shipped to some other point where it is treated with a fatty acid to make a lime soap. According to the present process the hydrated material and lime soap compound may be prepared for example at a plant hydrating lime with practically no increase in cost over the cost of hydrating lime, aside from the actual cost of the fatty acids employed. Accordingly a product which is not only cheaper to prepare but one which is even more effective as a water-proofing agent is obtained by my process.

What I claim is:—

1. The process of treating lime which comprises reacting on quick lime with water sufficient in quantity to produce a dry powder and in adding a fatty acid before hydration is completed.

2. The process of treating lime which comprises reacting on quick lime with water sufficient in quantity to produce a dry powder and in adding fatty acid before hydration is completed; the amount of the fatty acid employed being approximately 10% of the weight of the quick lime.

3. The process of treating lime which comprises reacting on quick lime with water sufficient in quantity to produce a dry powder and in adding liquid fatty acid before hydration is completed.

4. The process of treating quick lime which comprises adding water to powdered quick lime in the proportion to form a dry hydrated product and in adding fatty acid thereto immediately after the commencement of the hydration.

5. The process of treating quick lime which comprises adding a stream of water to a stream of crushed quick lime, causing the mixture to pass along an elongated receptacle while hydration ensues, and adding fatty acid to the reacting mass.

6. The continuous process of treating lime which comprises commingling a stream of quick lime with a stream of water in approximately equivalent proportions whereby hydration ensues and in adding a stream of fatty acid to the reacting mass while the latter is progressing through a reaction chamber.

7. The continuous process of treating lime which comprises commingling a stream of quick lime with a stream of water in approximately equivalent proportions whereby hydration ensues and in adding a stream of liquid fatty acid to the reacting mass while the latter is progressing through a reaction chamber.

ABRAHAM E. HORN.